Patented June 19, 1951

2,557,808

UNITED STATES PATENT OFFICE 2,557,808

METHOD FOR INCREASING THE MELT VISCOSITY OF SYNTHETIC LINEAR POLYAMIDES

Isaac F. Walker, Hockessin, Del., assignor to E. I. du Pont de Nemours & Company, Wilmington, Del., a corporation of Delaware No Drawing. Application June 26, 1946, Serial No. 679,588

3 Claims. (Cl. 260—78)

This invention relates to polyamide resins having improved properties, and more particularly to a novel method for preparing them.

Synthetic linear condensation polyamides are useful in many applications, such as in the manufacture of fibers, bristles, sheets, tubes and the like. They can be prepared by the methods described in U. S. Patents 2,071,250; 2,071,253; and 2,130,948.

These polyamides, used in the practice of this invention, comprise the reaction product of a linear polymer-forming composition containing amide-forming groups, for example, those obtained by reacting material consisting essentially of bifunctional molecules each containing two reactive groups which are complementary to reactive groups in other molecules and which include complementary amide-forming groups. These polyamides can be obtained by the methods given in the previously mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that these reactants can be replaced by their equivalent amide-forming derivatives. These polycarbonamides have an intrinsic viscosity of at least 0.4, and have an average number of carbons of at least 2 in the segments of the chain separating the amide groups. The preferred polyamides have a unit length (defined as in Patents 2,071,253 and 2,130,- 948) of at least 7. However, these polyamides possess viscosities which are lower than desirable for use in certain other applications. For example, the melt viscosity of polyhexamethylene adipamide, as prepared by the ordinary methods, is undesirably low for its use in injection molding processes. Also, the transparency of articles cast from some of these polyamides is not as high as desired for certain uses.

This invention has as an object a new process for modifying linear polyamides. More specifically, this invention has as an object a novel process for increasing the viscosity of such polyamides. It is another object to improve the transparency of articles cast from such polyamides. Still other objects will appear hereinafter.

These objects are accomplished by methods described herein which comprise vacuum melt-blending a synthetic linear polyamide with a member of the class consisting of polybasic acids higher than dibasic, their anhydrides, esters, amides, and salts.

The process of this invention is carried out by first forming a uniform mixture of the synthetic linear polyamide and a polybasic acid higher than dibasic, or its derivative, by mixing the ingredients in an inert atmosphere, e. g. under a blanket of nitrogen, while heating them to a temperature above the melting point of the polyamide but below that at which rapid degradation of the polyamide takes place. The temperature is preferably maintained below 300° C. As soon as a uniform molten mixture is obtained (the actual time required being dependent on the quantity of reactants being mixed) it is stirred rapidly while being subjected to reduced pressure with continued heating to remove the volatile reaction products formed by reaction between the polybasic acid and the polyamide. The absolute pressure used in this vacuum treatment is maintained low enough to effect rapid removal of volatile materials. Pressures of 100 mm. of mercury are operable; however, it is preferred to use pressures of 0.01 to 10 mm. of mercury. The vacuum treatment is continued at the same temperature until the melt viscosity of the reaction mixture has increased to the desired degree, namely, to an increase of at least 10%. In some cases the vacuum treatment is discontinued as soon as the minimum pressure desired has been obtained, while in other cases the treatment is continued at the minimum pressure for a period ranging from several minutes to several hours, e. g., 5 hours or more, the exact time depending on the particular polybasic acid modifier and its concentration, and on the viscosity desired in the final product. An inert gas such as nitrogen is then introduced into the reaction vessel and the reaction mixture is discharged from the reaction vessel and cooled rapidly. If desired, the reaction mixture may be cooled in the vessel and removed later.

The invention is illustrated by the following examples in which the proportions of ingredients are expressed in parts by weight unless otherwise noted.

Example I

Forty-seven and one-half (47.5) parts of polyhexamethylene adipamide and 0.42 part of 85% phosphoric acid are blended at 270–280° C. by stirring in a glass reaction vessel in an atmosphere of nitrogen. In about 15 minutes the polymer and phosphoric acid forms a uniform melt of low viscosity. The reaction vessel is evacuated while the reaction mixture is stirred rapidly to minimize frothing. When the pressure reaches about 1 mm. of mercury, stirring is discontinued, nitrogen is admitted to the reaction vessel and the vessel and its contents cooled rapidly by plunging it into cold water. The resulting solid polymer is found to have a relative viscosity of 52 when measured as an 8.4% solution in 90% formic acid—10% water (by weight). The original unmodified polyhexamethylene adipamide has a relative viscosity of 27, when measured in the same way.

*Examples II–XIX*

The polyhexamethylene adipamide of Example I is vacuum melt-blended at 270–280° C. and at a pressure of about 1 mm. of mercury, by the same general procedure described in that example, with the particular polybasic acid, or derivative thereof, in the proportions and for the length of time indicated in the following table. The viscosities of the resulting modified polyamides are also included in this table.

is obtained with a vacuum treatment of about 2 minutes.

In addition to producing a desirable increase in viscosity, as illustrated in the examples, this vacuum melt-blending of polyamides with polybasic acids, or derivatives thereof, frequently yields products which are more transparent than the unmodified polyamide. If polyhexamethylene adipamide is melted in a mold and cooled rapidly, e. g. by plunging the mold into ice water, it is found that sections of polymer up to about 20 mils (0.020 inch) thickness are transparent, while thicker sections are translucent or opaque. On the other hand some of the modified polyhexamethylene adipamides of the examples have an improved transparency, sections molded in the same way in thicknesses up to 40 mils being

| Example No. | Parts by weight of Polyamide | Polybasic Acid or derivative | Parts by weight | Per Cent of Polyamide | Viscosity of Product | |
|---|---|---|---|---|---|---|
| | | | | | Melt | Relative |
| 1 | 47.5 | 85% Phosphoric acid | 0.42 | 0.75 | medium | 52 |
| 2 | 47.5 | 85% Phosphoric acid | 0.42 | 0.75 | high | 84 |
| 3 | 50 | 0.5% Phosphoric acid | 3 | 0.03 | ...do | 81 |
| 4 | 50 | Silica aerogel | 0.5 | 1.0 | ...do | 80 |
| 5 | 30 | Phosphorated octyl alcohol | 0.3 | 1.0 | ...do | 124 |
| 6 | 30 | ...do | 0.15 | 0.5 | ...do | 114 |
| 7 | 50 | Monosodium phosphate monohydrate | 1.75 | 3.5 | medium | |
| 8 | 50 | Disodium phosphate dodecahydrate | 4.3 | 8.6 | high | |
| 9 | 50 | Trisodium phosphate | 2.1 | 4.2 | v. high | |
| 10 | 50 | Diammonium phosphate | 2 | 4 | ...do | |
| 11 | 50 | Ammonium Borate | 1 | 2.0 | medium | 44 |
| 12 | 50 | Tetraphosphoric acid | 0.5 | 1.0 | high | |
| 13 | 50 | Styrene/maleic anhydride interpolymer | 0.5 | 1.0 | medium | 36 |
| 14 | 50 | Stearyl half ester of styrene/maleic anhydride interpolymer. | 0.5 | 1.0 | ...do | 53 |
| 15 | 50 | Polyamide from p-amino benzene sulfonamide and styrene/maleic anhydride interpolymer. | 2.5 | 5 | high | |
| 16 | 50 | Tricresyl phosphate | 2.34 | 4.7 | medium | 46 |
| 17 | 50 | Borotungstic acid | 1.0 | 2.0 | ...do | 45 |
| 18 | 50 | Mixture of mono- and dilauryl acid phosphates | 2 | 4 | ...do | |
| 19 | 50 | 25% Glycerophosphoric acid | 1 | 0.5 | ...do | 40 |
| Control | | None | | | low | 27 |

In all examples except 3, 4, 5 and 6, the vacuum treatment was discontinued after a pressure of about 1 mm. of mercury was reached. In Examples 3, 4, and 6, the time of treatment was continued 60 minutes, and in Example 5 for 45 minutes.

The percent of polybasic acid or derivative in the foregoing table designates the percentage by weight, based on the polyamide, of polybasic acid or derivative actually present in the modifier. The relative viscosity is that of an 8.4% solution of the isolated polymer in a 90% formic acid—10% water mixture at 25° C. In the above, and in the other examples the phosphoric acid is orthophosphoric acid unless otherwise designated. The phosphorated octyl alcohol in the table has the formula $(C_8H_{17})_5 Na_5P_6O_{20}$.

*Example XX*

Fifty (50) parts of polyhexamethylene sebacamide is vacuum melt-blended at 200° C. with 0.05 part of 85% phosphoric acid in the manner described in Example I. After 15 minutes vacuum treatment at about 1 mm. pressure, a product of very high melt viscosity is obtained.

*Example XXI*

Fifty (50) parts of poly-6-aminocaproic acid is vacuum melt-blended with 0.05 part of 85% phosphoric acid in the manner described in Example I. A product of very high melt viscosity transparent. This improved transparency is indicated by the results tabulated below:

| Modified polyamide of Example | Modifier | Per Cent | Max. thickness of transparent molding, mils |
|---|---|---|---|
| 1 | Phosphoric Acid | 0.75 | 40 |
| 6 | Phosphorated octyl alcohol | 0.5 | 40 |
| 7 | Monosodium phosphate | 3.5 | 40 |
| 8 | Disodium phosphate | 8.6 | 40 |
| 9 | Trisodium phosphate | 4.2 | 40 |
| 11 | Ammonium borate | 2 | 35 |
| 16 | Tricresyl phosphate | 4.7 | 35 |
| 19 | Glycerophosphoric acid | 0.5 | 40 |

Examples of further specific polyamides derived from amino acids and from mixtures of dibasic acids and aliphatic diamines, and useful in the practice of this invention, are polytetramethylene sebacamide, polypentamethylene adipamide, polypentamethylene sebacamide, polyhexamethylene suberamide, polyoctamethylene adipamide, polydecamethylene carbamide, polymerized 9-aminononanoic acid, and polymerized 11-aminoundecanoic acid. Interpolyamides can also be used.

Other inorganic or organic acids higher than dibasic, as well as the previously mentioned derivatives thereof, can be used in the present process. Examples of further acids of this kind are: citric acid, tricarballylic acid, trimesic acid, camphoronic acid, mellitic acid, hexahydromellitic acid, pyromellitic acid, ethane tetracarboxylic acid, pyrophosphoric acid, and arsenic acid. Phosphoric acid and its anhydrides, esters, amides, and salts are particularly useful in the process of this invention.

The esters useful in the practice of this invention are esters of the above-defined acids with mono- or polyhydric alcohols or phenols. Since the process involves heating the polyamide and polybasic acid derivative at relatively high temperatures, it is preferable to employ esters which are relatively non-volatile. For this reason, esters of long chain alcohols or of phenols are preferred. Further examples of esters which are operable include: butyl esters of styrene/maleic anhydride interpolymers, butyl polysilicate, triphenyl phosphate, and the like.

The amides useful in the practice of this invention are N-substituted and unsubstituted amides of the above-defined acids. Other specific amides which are operable include: N-butyl phosphonamide, citramide, and the anilide of styrene/maleic anhydride interpolymer.

Salts of the above-defined acids with ammonia, alkali metals, and alkaline earth metals can be employed in the process of this invention. The ammonia and alkali metal salts are particularly useful. Further specific examples of salts which are operable include potassium phosphate, magnesium pyrophosphate, calcium hypophosphite, magnesium citrate, and the like.

The anhydrides of any of the above-defined acids can also be used in the process of this invention. In addition to silica aerogel, other examples include boron trioxide, phosphorus pentoxide, tricarballylic anhydride acid, and the like.

The proportions of polybasic acid, or derivative thereof, used in the process of this invention can be varied over a considerable range. In general, proportions ranging from 0.01% to 10% of the weight of the synthetic linear polyamide are satisfactory. Preferably, amounts ranging from 0.02% to 5% of the polyamide are employed. The particular concentration of modifier selected depends on several factors, such as its type and the particular degree of viscosity increase desired in the polyamide being treated. Thus, to obtain a given increase in viscosity with a given polyamide, the more effective polybasic acid modifiers, e. g., phosphoric acid and its derivatives are used in the lower concentrations of this range. However, if a greater increase in viscosity is desired, or less effective modifiers are employed, a larger proportion of modifier within the above stated range is used, and the treatment is continued for a longer time.

The products of this invention are particularly useful in applications where polyamides having high viscosity are desired, e. g., in injection molding processes and where cast articles of improved transparency are desired. They are also useful for the manufacture of fibers, bristles, sheets, tubes, etc.

As many apparently widely different embodiments of this invention may be made without departing from the spirit and scope thereof, it is to be understood that I do not limit myself to the specific embodiments thereof except as defined in the appended claims.

I claim:

1. A process for increasing the melt viscosity of synthetic linear polyamides which comprises heating in an inert atmosphere a mixture of a preformed polyamide having an intrinsic viscosity of at least 0.4 with from 0.01% to 10%, by weight thereof, of phosphoric acid, said heating being at a pressure below 100 mm. of mercury at which volatile reaction products are removed, and being at a temperature above the melting point of the polyamide but below the temperature at which substantial degradation of the polyamide takes place, said polyamide having recurring hydrogen-bearing amide groups as an integral part of the main polymer chain, and having an average number of carbon atoms of at least two in the segments of the chain separating the amide groups.

2. The process set forth in claim 1 in which said phosphoric acid is present in the proportion of 0.02% to 5% by weight of said polyamide.

3. The process set forth in claim 2 in which said polyamide is polyhexamethylene adipamide.

ISAAC F. WALKER.

REFERENCES CITED

The following references are of record in the file of this patent:

UNITED STATES PATENTS

| Number | Name | Date |
|--------|------|------|
| 2,174,527 | Peterson | Oct. 3, 1939 |
| 2,342,823 | Schlack | Feb. 29, 1944 |
| 2,378,494 | Moncrieff et al. | June 19, 1945 |
| 2,387,530 | Prichard | Oct. 23, 1945 |
| 2,422,666 | Fuller | June 24, 1947 |
| 2,493,597 | Rothrock et al. | Jan. 3, 1950 |

Certificate of Correction

Patent No. 2,557,808                                              June 19, 1951

ISAAC F. WALKER

It is hereby certified that error appears in the printed specification of the above numbered patent requiring correction as follows:

Column 3, line 65, for "200° C." read *280° C.*;

and that the said Letters Patent should be read as corrected above, so that the same may conform to the record of the case in the Patent Office.

Signed and sealed this 21st day of August, A. D. 1951.

[SEAL]

THOMAS F. MURPHY,
*Assistant Commissioner of Patents.*